United States Patent
Liu et al.

(10) Patent No.: US 11,732,112 B1
(45) Date of Patent: Aug. 22, 2023

(54) METHOD OF PREPARING GRAPHENE/NATURAL RUBBER COMPOSITE WITH ENHANCED MECHANICAL PROPERTIES, THERMAL CONDUCTIVITY, AND WEAR RESISTANCE

(71) Applicants: NORTH UNIVERSITY OF CHINA, Taiyuan (CN); SHANXI ZHONGBEI NEW MATERIAL TECHNOLOGY CO., LTD., Taiyuan (CN)

(72) Inventors: Yaqing Liu, Taiyuan (CN); Guizhe Zhao, Taiyuan (CN); Mingshan Gong, Taiyuan (CN)

(73) Assignees: NORTH UNIVERSITY OF CHINA, Taiyuan (CN); SHANXI ZHOHNGBEI NEW MATERIAL TECHNOLOGY CO., LTD., Taiyuan (CN)

( * ) Notice: Subject to any disclaimer, the term of this patent is extended or adjusted under 35 U.S.C. 154(b) by 0 days.

(21) Appl. No.: 18/062,877

(22) Filed: Dec. 7, 2022

(51) Int. Cl.
*C08K 3/36* (2006.01)
*C08L 7/00* (2006.01)
*C08K 3/04* (2006.01)

(52) U.S. Cl.
CPC ............... *C08L 7/00* (2013.01); *C08K 3/042* (2017.05); *C08K 3/36* (2013.01); *C08L 2310/00* (2013.01)

(58) Field of Classification Search
CPC ............. C08K 3/36; C08K 3/042; C08L 7/00
USPC ........................................................ 524/495
See application file for complete search history.

(56) References Cited

FOREIGN PATENT DOCUMENTS

| | | | |
|---|---|---|---|
| CN | 104262700 A | 1/2015 | |
| CN | 105152161 A | 12/2015 | |
| CN | 110240746 A | 9/2019 | |
| CN | 110862595 A | 3/2020 | |
| CN | 111499935 A | * 8/2020 | ............. C08K 3/042 |
| CN | 112048107 A | 12/2020 | |
| CN | 113462040 A | 10/2021 | |
| WO | 2021170151 A1 | 9/2021 | |

OTHER PUBLICATIONS

Lijun Chu et al., Constructing Chemical Interface Layers by Using Ionic Liquid in Graphene Oxide/Rubber Composites to Achieve High-Wear Resistance in Environmental-Friendly Green Tires, ACS Applied Materials & Interfaces, vol. 14, No. 4, pp. 5995-6004.
Shuaishuai Cheng et al., Preparation of a natural rubber with high thermal conductivity, low heat generation and strong interfacial interaction by using NS-modified graphene oxide. Journal of Materials Science, 56(5), pp. 4034-4050.
Yiwen Cui et al., Preparation and Properties of Modified Graphene Oxide/NR Composites,China Rubber Industry, vol. 69, No. 4, pp. 256-260.
Meng Jiang et al., Preparation of Modified-Multilayer Graphene Oxide/Silica and Its Application in Reinforced Natural Rubber Composites, Polymer Materials Science & Engineering, vol. 35, No. 9, pp. 134-141.

* cited by examiner

*Primary Examiner* — Deve V Hall (57) ABSTRACT

This application relates to natural rubber (NR) composites, and more specifically to a method of preparing a graphene/natural rubber composite. In the method provided herein, nano-silica loaded graphene oxide ($SiO_2$-GO) is formed by electrostatic interaction between silica and graphene oxide (GO), and then the $SiO_2$-GO is added to natural rubber (NR) latex to obtain a $SiO_2$-GO/NR masterbatch by aqueous phase synergistic aggregation-precipitation process. The $SiO_2$-GO/NR masterbatch is subjected to mechanical blending and vulcanization to obtain the graphene/NR composite.

8 Claims, 6 Drawing Sheets

METHOD OF PREPARING GRAPHENE/NATURAL RUBBER COMPOSITE WITH ENHANCED MECHANICAL PROPERTIES, THERMAL CONDUCTIVITY, AND WEAR RESISTANCE

CROSS-REFERENCE TO RELATED APPLICATIONS

This application claims the benefit of priority from Chinese Patent Application No. 202210683297.0, filed on Jun. 17, 2022. The content of the aforementioned application, including any intervening amendments thereto, is incorporated herein by reference.

TECHNICAL FIELD

This application relates to natural rubber (NR) composites, and more specifically to a method of preparing a graphene/natural rubber composite with enhanced mechanical properties, thermal conductivity, and wear resistance.

BACKGROUND

Natural rubber (NR) is excellent in physical properties, such as resilience, insulation, tear resistance, and plasticity, and has thus been widely used. However, although NR has the self-reinforcing property, it still cannot meet the use requirements in some fields.

Graphene and derivatives thereof have extremely excellent physicochemical properties, and can significantly improve the mechanical properties, thermal conductivity, and electrical conductivity of a polymer matrix. Graphene oxide (GO) is a two-dimensional (2D) material with various oxygen-containing functional groups, which is generally prepared from graphite through chemical oxidation. There are many oxygen-containing functional groups on GO surface, which can react with many functional groups, such that GO can be easily compounded with other functional particles. Silicon dioxide, also known as white carbon black, is considered the optimum rubber reinforcing filler to replace carbon black due to its smaller particle size and more multiple surface functional groups. The addition of silica to the rubber matrix can improve mechanical properties and reduce the rolling resistance of tyres made of the rubber composite. Mechanical properties of rubber composites are directly associated with their construction of the cross-linked network and the dispersion of fillers in the rubber matrix. Under exposure to dynamic loading, a stronger cross-linked network will prevent the rubber macro-molecular chains from slipping off the filler surfaces. Moreover, the wear loss of rubber is related to its own resistance, mechanical properties, filler network structure, and cross-linked network structure. Therefore, constructing a better cross-linked network is the key to reaching enhanced rubber performance. Excellent mechanical properties can expand the application range of the rubber; good thermal conductivity contributes to less heat accumulation during use; and outstanding wear resistance can extend the service life of the rubber products.

SUMMARY

An object of this application is to provide a method of preparing a graphene/natural rubber composite with enhanced mechanical properties, thermal conductivity, and wear resistance.

Technical solutions of this application are described as follows.

This application provides a method of preparing a graphene/natural rubber composite, in which graphene oxide loaded by nano-silica ($SiO_2$-GO) is formed by an electrostatic interaction between nano-silica and graphene oxide (GO), and then added to natural rubber (NR) latex to obtain a $SiO_2$-GO/NR masterbatch by an aqueous phase synergistic aggregation-precipitating process, which is further subjected to mechanical blending and vulcanization to obtain a GO/NR composite.

In the method provided herein, through the combination of the aqueous phase synergistic aggregation-precipitating process and the mechanical blending process, the $SiO_2$-loaded GO particles can be evenly dispersed in the vulcanized NR. The electrostatic interaction between silica and GO is a dynamic force that not only enhances the cross-linked network structure and cross-linking density of the graphene/natural rubber composite, but also enables the graphene fillers to entangle a large number of rubber molecular chains and enhances the interfacial interaction between graphene and the rubber matrix during the dynamic movement of the rubber products, so as to produce the vulcanized GO/NR composite with enhanced mechanical properties, thermal conductivity, and wear resistance.

Specifically, this application provides a method of preparing a graphene/natural rubber composite, comprising:

(S1) evenly dispersing a silane coupling agent in a first solvent to obtain a hydrolysis solution, wherein the silane coupling agent is 3-aminopropyltriethoxysilane; evenly dispersing silica in a second solvent to obtain a first dispersion; and mixing the hydrolysis solution with the first dispersion, followed by reaction, vacuum filtration, rinsing, and drying, to obtain an amino-modified silica; and dispersing the amino-modified silica in deionized water by ultrasonication to produce a second dispersion; dropwise adding a citric acid solution to the second dispersion, followed by ultrasonication, centrifugation, and rinsing to pH 7 to obtain a protonated amino-modified silica dispersion; and adding the protonated amino-modified silica dispersion to a graphene oxide (GO) aqueous dispersion, followed by ultrasonication to obtain a silica-loaded GO aqueous dispersion, wherein the silica is loaded on GO surfaces through an electrostatic interaction;

(S2) diluting a natural rubber (NR) latex with deionized water, followed by addition of the silica-loaded GO aqueous dispersion and uniform dispersion to obtain a mixed emulsion; adding a flocculant to the mixed emulsion to allow silica-loaded GO particles and rubber particles to absorb each other through π-π interaction, followed by aggregation and co-precipitation to obtain a crude rubber; and subjecting the crude rubber to washing, and drying to obtain a silica-loaded GO/NR masterbatch; and (S3) successively adding an anti-aging agent, an antioxidant, an activator, and a softening agent to the silica-loaded GO/NR masterbatch followed by an internal mixing to obtain a rubber mixture; adding a vulcanization accelerator and a vulcanizing agent to the rubber mixture followed by an open milling, mill run until the rubber mixture is free of air bubbles, and standing; and transferring the rubber mixture to a mold followed by vulcanization to obtain the graphene/natural rubber composite.

In an embodiment, in step (S1), the first solvent and the second solvent are independently a mixture of water and ethanol in a volume ratio of 1:1-3; the silane coupling agent is 5-15% by weight of the silica; the reaction is performed at 65-85° C. for 4-8 h; and the drying is performed at 50-70° C.

In an embodiment, in step (S1), a concentration of the amino-modified silica in the second dispersion is 50-300 mg/mL; and a concentration of the citric acid solution is 1.5-4 mol/L.

In an embodiment, in step (S1), a concentration of the GO aqueous dispersion is 0.5-10 mg/mL.

In an embodiment, in step (S1), a weight ratio of the amino-modified silica to the citric acid solution is 1-3:0.5-1; and in the $SiO_2$ loaded-GO aqueous dispersion, a weight ratio of GO to silica is 1:10-60.

In an embodiment, in step (S1), the ultrasonication is performed at 50-300 W.

In an embodiment, in step (S2), the NR latex is diluted with the deionized water to a concentration of 10-40 wt. %; a concentration of the flocculant is 10 wt. %; and a weight ratio of the flocculant to the NR is 2-6:100.

In an embodiment, in step (S3), a weight ratio of the anti-aging agent, the antioxidant, the activator, the softening agent, the vulcanizing accelerator, and the vulcanizing agent is 1:1:5:2:2:2.

In an embodiment, a weight ratio of the NR to the silica-loaded graphene oxide to rubber additive is 100:(0.5-30):(11-13), where the rubber additive includes the anti-aging agent, antioxidant, activator, softening agent, vulcanization accelerator, and vulcanizing agent.

Compared with the prior art, this application has the following beneficial effects.

(1) This application adopts an efficient and simple aqueous phase synergistic aggregation-precipitation process to produce a graphene masterbatch, facilitating industrial production. Through this process, various components can be dispersed evenly in the masterbatch, that is, the graphene is well dispersed in the masterbatch. In addition, through the mechanical blending process, the $SiO_2$-loaded GO particles can be dispersed more evenly in the NR matrix, which facilitates the production of the final graphene/natural rubber composite with improved mechanical properties, thermal conductivity, and abrasion resistance.

(2) In the method provided herein, the electrostatic interaction between $SiO_2$ and GO is a dynamic force, which can not only enhance the cross-linked network structure and cross-link density of the graphene/natural rubber composite, but also enables the graphene fillers to entangle a large number of rubber molecular chains and thus enhances the interfacial interaction between graphene and the rubber matrix during the dynamic movement of the rubber products, allowing for enhanced mechanical properties, thermal conductivity, and wear resistance.

(3) The preparation process in this application has a simple and green operation, and mild reaction conditions, and the equipment involved is conventional. Therefore, it is suitable for industrial production, and has great significance in promoting the application of graphene in high-performance rubber products.

BRIEF DESCRIPTION OF THE DRAWINGS

To illustrate the technical solutions in the embodiments of the present disclosure or in the prior art more clearly, the accompanying drawings needed in the description of the embodiments or the prior art will be described briefly below. Obviously, presented in the accompanying drawings are merely some embodiments of the present disclosure, which are not intended to limit the disclosure. Other drawings can be obtained by one of ordinary skill in the art according to the accompanying drawings provided herein without paying any creative effort.

DETAILED DESCRIPTION OF EMBODIMENTS

The technical solutions of the present disclosure will be described in detail below. It should be noted that the embodiments are merely illustrative and are not intended to limit the disclosure. Based on the embodiments in the present disclosure, all other embodiments obtained by one of ordinary skill in the art without paying creative efforts shall fall within the scope of the present disclosure.

This application provides a method of preparing a graphene/natural rubber composite, in which nano-silica loaded GO is formed by an electrostatic interaction between silica and graphene oxide (GO) ($SiO_2$—$NH_3^+$/GO), and added to natural rubber (NR) latex to obtain a $SiO_2$—$NH_3^+$/GO/NR masterbatch by aqueous phase synergistic aggregation-precipitating process, which is further subjected to mechanical blending and vulcanization to obtain a GO/NR composite.

Specifically, this application provides a method of preparing a NR composite with enhanced mechanical, thermal, and wear resistance properties, which includes the following steps.

(S1) A silane coupling agent is dispersed evenly in a first solvent to obtain a hydrolysis solution, wherein the silane coupling agent is 3-aminopropyltriethoxysilane. Silica is dispersed evenly in a second solvent to obtain a first dispersion. The hydrolysis solution is mixed with the first dispersion, followed by reaction, vacuum filtration, rinsing, and drying, to obtain an amino-modified silica (m-SiO$_2$).

The m-SiO$_2$ is added to deionized water followed by ultrasonication to produce a second dispersion. A citric acid solution is dropwise added to the second dispersion, followed by ultrasonication, centrifugation, and rinsing to pH 7 to obtain a protonated amino-modified silica dispersion. The protonated amino-modified silica dispersion is added to a graphene oxide (GO) aqueous dispersion followed by ultrasonication to obtain a silica-loaded GO aqueous dispersion (SiO$_2$—NH$_3^+$/GO), where silica is loaded on GO surfaces through an electrostatic interaction.

(S2) A natural rubber (NR) latex is diluted with deionized water, followed by addition of the SiO$_2$—NH$_3^+$/GO aqueous dispersion and uniform dispersion to obtain a mixed emulsion. A flocculant is added to the mixed emulsion to allow SiO$_2$—NH$_3^+$/GO particles and rubber particles to absorb each other through π-π interaction, followed by aggregation and co-precipitation to obtain a crude rubber. The crude rubber is subjected to washing, dehydrating, and drying to obtain a silica-loaded GO/NR masterbatch (SiO$_2$—NH$_3^+$/GO/NR).

(S3) An anti-aging agent, an antioxidant, an activator, and a softening agent are successively added to the SiO$_2$—NH$_3^+$/GO/NR masterbatch, followed by an internal mixing to obtain a rubber mixture. A vulcanizing accelerator and a vulcanizing agent are added to the rubber mixture, followed by an open milling, mill run until the rubber mixture is free of air bubbles. The rubber mixture is stood and then transferred to a mold to undergo vulcanization, so as to obtain the graphene/natural rubber composite with enhanced mechanical, thermal, and wear resistance properties.

This application also provides the preparation mechanism related to the above preparation method.

Figure 7:
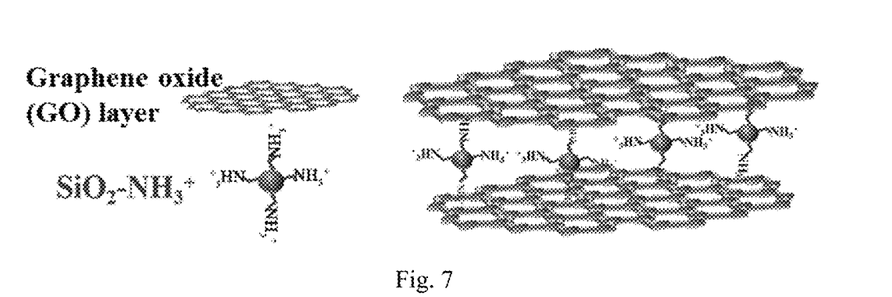
FIG. 7 schematically shows the morphology of $SiO_2$—$NH_3^+$/GO, in which GO surface is loaded by silica through an electrostatic interaction between these two.

(1) In the hydrolysis process, the ethoxy group contained in the silane coupling agent 3-aminopropyltriethoxysilane (KH550) will be hydrolyzed to a hydroxyl group, where the intermediate product is silanol. The hydroxyl group in the silanol and the hydroxyl group on the surface of the silica undergo a dehydration and condensation reaction so that the surface of the silica is grafted with other functional groups, i.e., amino group. Subsequently, the amino group grafted on the silica surface is protonated under acidic conditions with the assistance of ultrasonication. The relevant reaction scheme is shown below:

(2) The electrostatic interaction between the positive ammonia ions on the surface of the modified silica and a large number of oxygen-containing functional groups on the surface of GO render the silica to be loaded on the surface of GO, as shown in FIG. 7, where FIG. 7a schematically shows the morphology of the GO sheet layer and SiO$_2$—NH$_3^+$, and FIG. 7b schematically shows the loading of silica on the surface of GO through an electrostatic interaction between these two.

In an embodiment, in step (S1), the first and second solvent is a mixture of water and ethanol in a volume ratio of 1:1-3, preferably, 1:3; the silane coupling agent is 5-15% by weight of the silica, preferably, 10-12%; the reaction is performed at 65-85° C. for 4-8 h, preferably, 70-80° C. for 5-7 h; and the drying is performed at 50-70° C., preferably, 70° C.

In an embodiment, in step (S1), a concentration of the amino-modified silica in the second dispersion is 50-300 mg/mL; and a concentration of the citric acid solution is 1.5-4 mol/L.

In an embodiment, in step (S1), a concentration of the graphene oxide (GO) aqueous dispersion is 0.5-10 mg/mL.

In an embodiment, in step (S1), a weight ratio of the amino-modified silica powder to the citric acid solution is 1-3:0.5-1; and in the SiO$_2$ loaded-GO aqueous dispersion, a weight ratio of GO to silica is 1:10-60.

In an embodiment, in step (S1), the ultrasonication is performed at 50-300 W.

In an embodiment, in step (S2), the NR latex is diluted with the deionized water to a concentration of 10-40 wt. %; a concentration of the flocculant is 10 wt. %; and a weight ratio of the flocculant to the NR is 2-6:100.

In an embodiment, in step (S2), the flocculant is selected from the group consisting of a calcium chloride solution, a sodium chloride solution, a potassium chloride solution, a sodium sulfate solution, a hydrochloric acid solution, a formic acid solution, and a combination thereof.

In an embodiment, in step (S3), a weight ratio of the anti-aging agent, the antioxidant, the activator, the softening agent, the vulcanizing promoter, and the vulcanizing agent is 1:1:5:2:2:2.

In an embodiment, the vulcanized SiO$_2$—NH$_3^+$/GO/NR is prepared from 100 parts by weight of NR, 0.5-30 parts by weight of SiO$_2$—NH$_3^+$/GO, and 11-13 parts by weight of a rubber additive, where the rubber additive includes the anti-aging agent, antioxidant, activator, softening agent, vulcanization accelerator, and vulcanizing agent.

In an embodiment, in step (S3), the vulcanization accelerator is N-tert-butyl-2-benzothiazole hyposulfonamide, N-cyclohexyl-2-benzothiazole hyposulfonamide, or N-(oxydiethylidene)-2-benzothiazole hyposulfonamide; the vulcanizing agent is sulfur or sulfur monochloride; the antioxidant is selected from the group consisting of 2,6-di-tert-butyl-4-methylphenol, 2,2,4-trimethyl-1,2-dihydroquinoline polymer or 2-mercaptobenzimidazole. The antioxidant is N-isopropyl-N'-phenyl-p-phenylenediamine, p-phenylaniline or dodecyl dipropionate sulphide; the activator is zinc gluconate, zinc oxide, or magnesium oxide; the softening agent is stearic acid, dibutyl titanate or dioctyl adipate.

In an embodiment, in step (S3), the internal mixing is performed at 105-120° C. for 3-5 min. The open mill is performed at 50-70° C. for 8-12 min. The rubber mixture is subjected to standing for 18-36 h. The vulcanization is performed at 135-170° C. under 10-30 MPa for 10-25 min.

The technical solutions of the present disclosure will be described in detail with reference to the following embodiments.

Example 1

Provided herein was a method of preparing a graphene/natural rubber composite, which included the following steps.

(1) 11 g of 3-aminopropyltriethoxysilane (silane coupling agent KH550) was added to a mixture of deionized water (33 g) and ethanol (66 g) and subjected to ultrasonic stirring for 15 min and mechanical stirring for 45 min to allow full hydrolysis of 3-aminopropyltriethoxysilane, so as to obtain a hydrolyzed 3-aminopropyltriethoxysilane solution. 100 g of silica was added to 100 mL of a mixture of ethanol and distilled water in a volume ratio of 3:1, subjected to ultrasonic dispersion at 100 W for 30 min, and added with the hydrolyzed 3-aminopropyltriethoxysilane solution. The reaction mixture was reacted at 75° C. for 6 h, and subjected to vacuum filtration, rinsing, and drying at 70° C. to obtain amino-modified silica powder m-$SiO_2$.

5 g of m-$SiO_2$ was subjected to ultrasonic dispersion in deionized water for 20 min to produce a m-$SiO_2$ dispersion. The m-$SiO_2$ dispersion was added with a citric acid solution (2.3 mol/L), and subjected to ultrasonication, centrifugation, and rinsing to neutral to obtain a protonated amino-modified silica ($SiO_2$—$NH_3^+$) dispersion, where a weight ratio of the m-$SiO_2$ to the citric acid was 5:4.41.

(2) A graphene oxide (GO) aqueous dispersion with a concentration of 0.5 mg/mL was prepared.

(3) The $SiO_2$—$NH_3^+$ dispersion was added to 250 mL of the aqueous GO dispersion, followed by ultrasonic dispersion at room temperature for 15 min to obtain a silica-loaded GO aqueous dispersion ($SiO_2$—$NH_3^+$/GO), where the $SiO_2$—$NH_3^+$ was loaded on GO through electrostatic interaction. The amounts of raw materials (i.e., $SiO_2$ and GO) were shown in Table 1.

(4) A 60 wt. % natural rubber (NR) latex (167 g) was diluted with deionized water, followed by stirring to obtain a 20 wt. % NR latex. The 20 wt. % NR latex was then added with $SiO_2$—$NH_3^+$/GO followed by stirring to obtain a mixed emulsion. 25 g of calcium chloride solution of a flocculant (10 wt. %) was added to the mixed emulsion to allow $SiO_2$—$NH_3^+$/GO particles and rubber particles to absorb each other, followed by aggregation and co-precipitation to obtain a crude rubber. The crude rubber was subjected to washing, dehydrating, and drying to a constant weight at 65° C. to obtain a $SiO_2$—$NH_3^+$/GO/NR masterbatch.

(5) The $SiO_2$—$NH_3^+$/GO/NR masterbatch was placed in an internal batch mixer to undergo internal mixing at 110° C. and 40 rpm to obtain a rubber mixture. During the internal mixing, 1 g of an anti-aging agent 4010NA, 1 g of an antioxidant RD, 5 g of an activator ZnO, and 2 g of a softening agent SA were added to the internal batch mixer three times. Each internal mixing lasted for 4 min. After the internal mixing, the rubber compound was discharged, cooled down to room temperature, and then transferred to an open mill to undergo an open mill at 60° C. After that, 2 g of vulcanization accelerator NOBS and 2 g of sulfur were added to the rubber compound, followed by mixing until the rubber mixture was free of bubbles. After standing for 24 h, the rubber mixture was transferred to a vulcanizer to undergo vulcanization at 150° C. and 15 MPa for a certain time ($t_{c90}$) to obtain a vulcanized $SiO_2$—$NH_3^+$/GO/NR with optimized performance, where $t^{c90}$ was measured by a rubber processing analyzer (RPA).

Example 2

The preparation method provided in Example 2 was basically the same as that in Example 1 except that in this example, the amount of m-$SiO_2$ was 10 g.

Example 3

The preparation method provided in Example 3 was basically the same as that in Example 1 except that in this example, the amount of m-$SiO_2$ was 20 g.

Example 4

The preparation method provided in Example 4 was basically the same as that in Example 1 except that in this example, the amount of m-$SiO_2$ was 30 g.

Comparative Example 1 ($SiO_2$ was Loaded on the Surface of GO Through Hydrogen Bonding, Denoted as $SiO_2$/GO)

An appropriate amount of $SiO_2$ was weighed and then ultrasonically dispersed in deionized water to obtain a homogeneous $SiO_2$ dispersion. A GO aqueous dispersion with a concentration of 0.5 mg/mL was prepared, and then added with the homogeneous $SiO_2$ dispersion several times and mixed well to obtain a silica-loaded GO aqueous dispersion ($SiO_2$/GO), where the silica was loaded on GO via hydrogen bonding. The amounts of raw materials (i.e., $SiO_2$ and GO) were shown in Table 1.

The subsequent preparation processes of $SiO_2$/GO/NR masterbatch and vulcanized $SiO_2$/GO/NR were basically the same as steps (4) and (5) of Examples 1-4, except that in this example, the silica was loaded on GO via hydrogen bonding.

Comparative Example 2 ($SiO_2$ was Loaded on the Surface of GO Through Chemical Binding, Denoted as $SiO_2$-GO)

(1) A $SiO_2$—$NH_3^+$ dispersion solution was prepared according to step (S1) of Example 1.

(2) A GO aqueous dispersion with a concentration of 0.5 mg/mL was prepared.

(3) 250 mL of the GO aqueous dispersion was added with the $SiO_2$—$NH_3^+$ dispersion solution, ultrasonically dispersed for 15 min, dropwise added with a solution of N-hydroxysuccinimide, magnetically stirred for 30 min, dropwise added with a 1-ethyl-3-(3-dimethylaminopropyl) carbodiimide solution, and stirred magnetically for 24 h in an ice bath to produce a silica-loaded GO aqueous dispersion ($SiO_2$-GO), where the silica was loaded on GO through a chemical binding. The amounts of the specific raw materials (i.e., $SiO_2$ and GO) were shown in Table 1.

The subsequent preparation processes of $SiO_2$-GO/NR masterbatch and vulcanized $SiO_2$-GO/NR were basically the same as steps (4) and (5) of Examples 1-4, except that in this example, the silica was loaded on through chemical binding.

Comparative Example 3

The preparation method in this example was basically the same as the method in Example 1, except that in this example, silica was not introduced.

The formulations for Examples 1-4 and Comparative Examples 1-3 were shown in Table 1, and the performance test results were shown in Table 2.

TABLE 1

Formulations of Examples 1-4 and Comparative Examples 1-3

|  | Weight of fillers/(g) | | Weight of natural rubber (NR)/(g) | Weight of rubber additive/(g) |
| --- | --- | --- | --- | --- |
|  | graphene oxide (GO) | $SiO_2$ | | |
| Example 1 | 0.5 | 5 | 100 | 13 |
| Example 2 | 0.5 | 10 | 100 | 13 |
| Example 3 | 0.5 | 20 | 100 | 13 |
| Example 4 | 0.5 | 30 | 100 | 13 |
| Comparative Example 1 | 0.5 | 5 | 100 | 13 |
| Comparative Example 2 | 0.5 | 5 | 100 | 13 |
| Comparative Example 3 | 0.5 | — | 100 | 13 |

The performance tests were described below.

(1) Fourier Transform Infrared Spectroscopy (FT-IR) Analysis

The functional group analysis of $SiO_2$ and m-$SiO_2$ was carried out by using an IS50 Fourier Transform Infrared Spectrometer from American Thermoelectric Corporation in the range of 500-4000 $cm^{-1}$, where the sample was mixed with KBr powder in a weight ratio of 1:100 and pressed into a thin sheet for testing.

Figure 1:
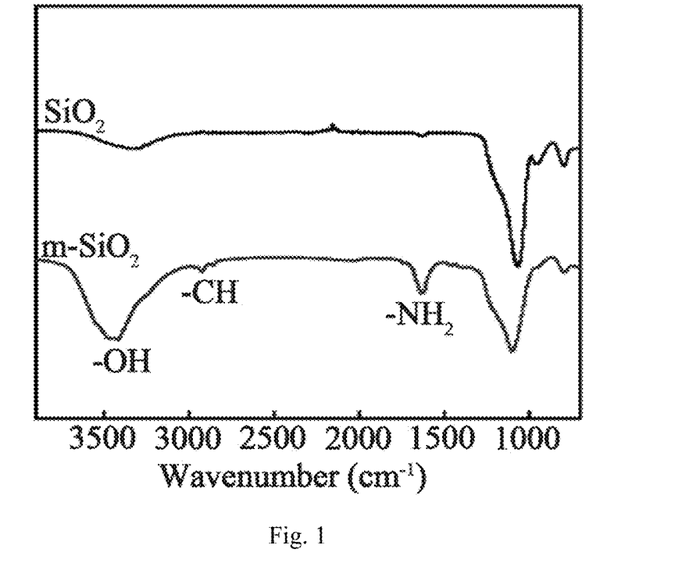
FIG. 1 shows the infrared spectra of silica and KH550-modified silica according to Example 1 and Comparative example 2 of the present disclosure.

As shown in FIG. 1, the peak at 3410 $cm^{-1}$ was attributed to the –OH stretching vibrations on the surface of $SiO_2$, the peak at 795 $cm^{-1}$ was the symmetric stretching vibration peak of Si—O—Si specific to $SiO_2$, and the peak at 1066 $cm^{-1}$ corresponded to the antisymmetric stretching vibration peak of Si—O—Si. The FT-IR spectrum of m-$SiO_2$ clearly showed the in-plane deformation vibration peak of N—H in —$NH_2$ at 1633 $cm^{-1}$ and the characteristic C—H stretching vibration peak at 2930 $cm^{-1}$, indicating the successful modification of $SiO_2$ by the silane coupling agent KH550.

(2) X-Ray Diffraction Analysis

Figure 4:
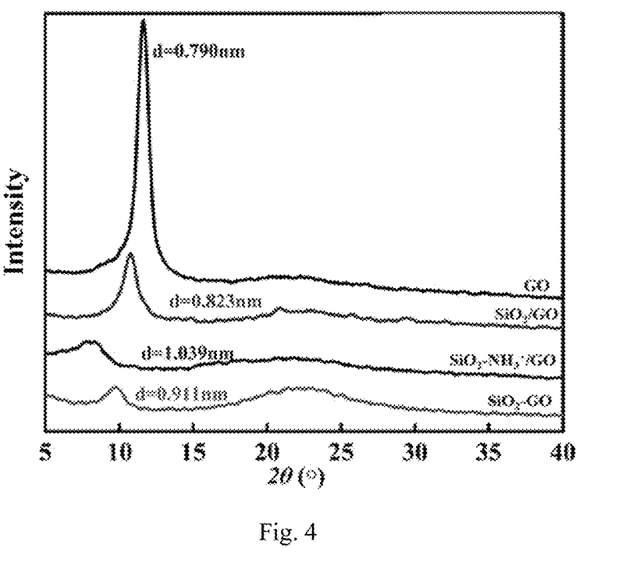
FIG. 4 is the X-ray diffraction (XRD) pattern of nano-$SiO_2$-loaded GO by electrostatic interaction prepared in Example 1 ($SiO_2$—$NH_3^+$/GO), Comparative Example 1, and Comparative Example 2, where an interlayer spacing d of GO is calculated by the Bragg equation.

The crystal structures of GO, $SiO_2$/GO, $SiO_2$—$NH_3^+$/GO, and $SiO_2$-GO were tested and analyzed by using a DX-2700B X-ray diffraction analyzer from Dandong Fangyuan with a scanning angle of 5-80°, a sampling time of 0.2 s, and a step angle of 0.03°. The layer spacing of GO was calculated by using the Bragg equation:

$$\lambda = 2d \sin \theta$$

As shown in FIG. 4, the layer spacing of GO was significantly increased after the introduction of nano-$SiO_2$, directly demonstrating that nano-$SiO_2$ was successfully intercalated between layers of GO under the action of ultrasound. Compared with the $SiO_2$/GO prepared in Comparative Example 1 (namely, a hydrogen-bonding interaction existed between $SiO_2$ and GO), the $SiO_2$—$NH_3^+$/GO prepared in Example 1 (an electrostatic interaction existed between $SiO_2$ and GO) and the $SiO_2$-GO prepared in Comparative Example 2 (namely, a chemical bonding existed between $SiO_2$ and GO) resulted in a larger layer spacing of GO. Moreover, it was also obvious that the layer spacing of $SiO_2$-GO prepared in Comparative Example 2 was much smaller than that of $SiO_2$—$NH_3^+$/GO prepared in Example 1, indicating a good chemical bonding between GO and $SiO_2$, and further verifying that the electrostatic interaction force between GO and $SiO_2$ was reversible.

(3) Zeta Potential Analysis

The potential of the $SiO_2$—$NH_3^+$ dispersion and the GO dispersion were tested by using an NS-90Z zeta potential analyzer from Omcc Company.

Figure 2:
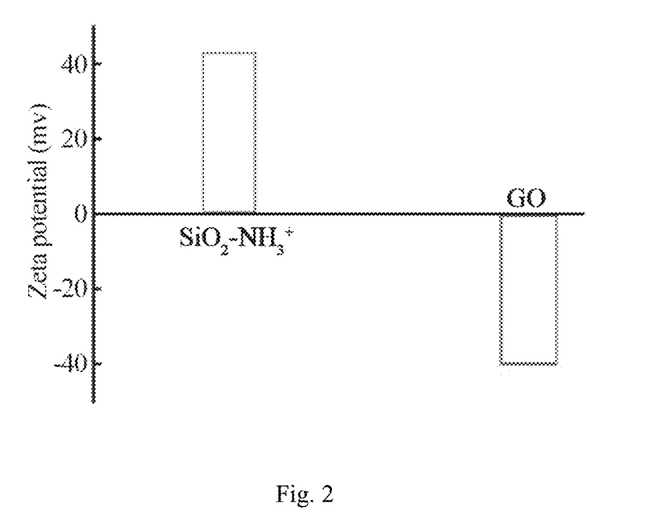
FIG. 2 shows the Zeta potentials of a protonated silica-loaded graphene oxide aqueous dispersion and graphene oxide (GO) according to Example 1 of the present disclosure.

FIG. 2 clearly showed the Zeta potentials of a protonated amino-modified silica ($SiO_2$—$NH_3^+$) aqueous dispersion and graphene oxide (GO) aqueous dispersion. After the treatment by using citric acid, the grafted amino groups on the surface of the modified $SiO_2$ were protonated to render the diluted silica dispersion to be positively charged with a potential of +43 mv as measured by the Zeta potential analyzer. In contrast, the potential of the GO dispersion was −40 mv as measured by the Zeta potential analyzer, verifying the successful protonation of amino groups in the modified $SiO_2$ and the existing electrostatic adsorption effects between the protonated $SiO_2$ potential dispersion and the diluted GO dispersion.

(4) X-Ray Photoelectron Spectroscopy Analysis

Figure 3A:
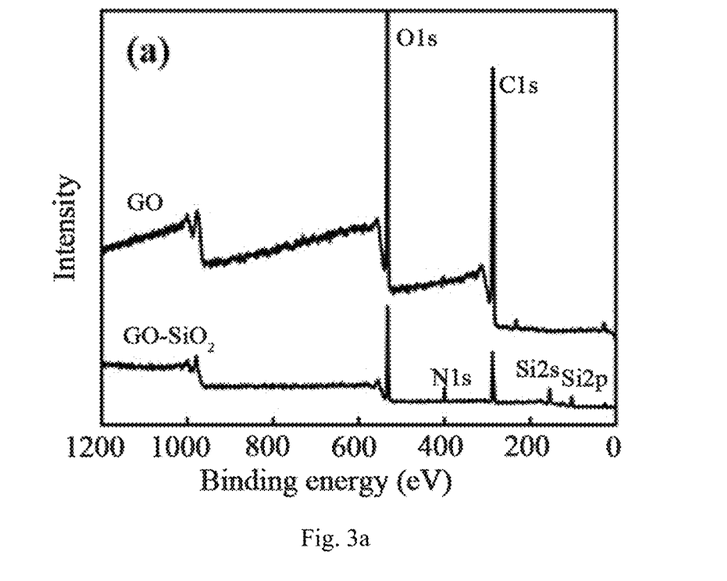
FIG. 3a is the full X-ray photoelectron spectroscopy (XPS) spectrum of GO and $SiO_2$-GO prepared in Comparative Example 2 of the present disclosure.
Figure 3B:
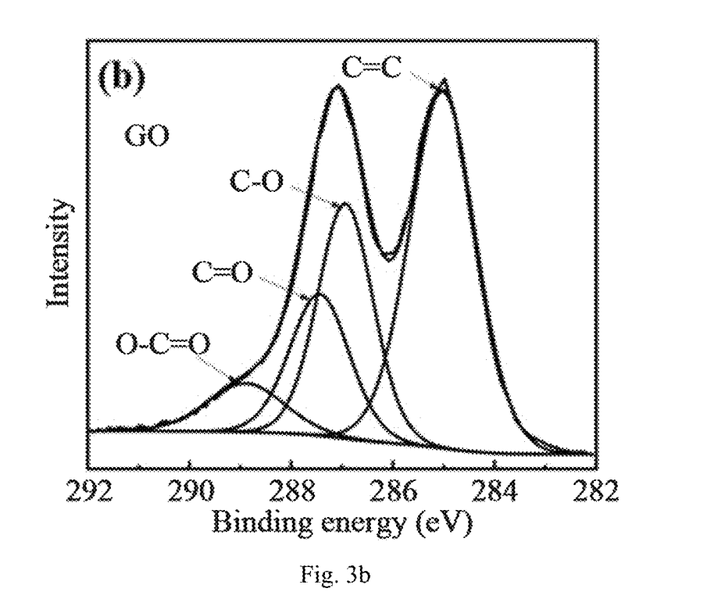
FIG. 3b shows the C 1s XPS spectrum of GO.
Figure 3C:
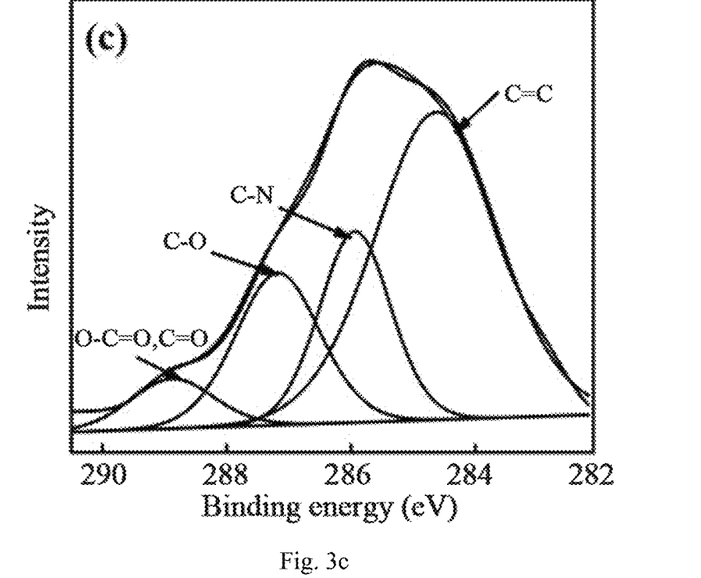
FIG. 3c shows the C 1s XPS spectrum of $SiO_2$-GO prepared in Comparative Example 2 of the present disclosure.
Figure 3D:
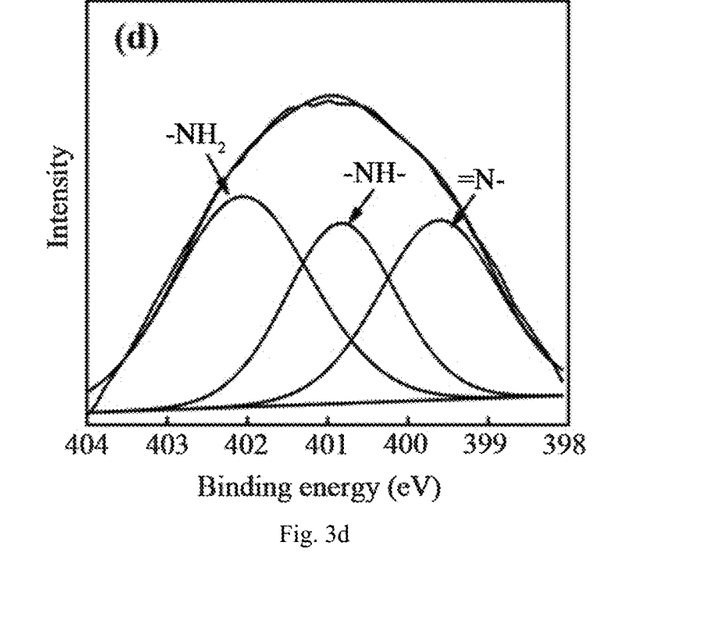
FIG. 3d shows the N 1s XPS spectrum of $SiO_2$-GO prepared in Comparative Example 2 of the present disclosure.

A NEXSA-type X-ray photoelectron spectroscopy analyzer from Thermo Fisher Company (USA) was used to test and analyze the changes of GO and GO loaded with $SiO_2$ in surface elements and chemical compositions. FIG. 3a showed the XPS full spectra of $SiO_2$-GO prepared in Comparative Example 2 and GO, in which Si 2s and Si 2p peaks were specific to Si and N 1s peaks existing in the XPS full spectrum of $SiO_2$-GO. In FIG. 3b, peaks at 284.8 eV and 286.8 eV were respectively assigned to C=C and C—O, and peaks at 287.8 eV and 288.5 eV were respectively assigned to C=O and O—C=O. In FIG. 3c, a new C—N peak appeared at 285.8 eV, indicating an amination reaction between the oxygen-containing functional group on the surface of GO and the amino groups on the surface of $SiO_2$ and the chemical bonding between GO and $SiO_2$. In FIG. 3d, the peak at 399.3 eV was assigned to =N—; the peak at 400.3 eV was assigned to —N—H; and the peak at 401.7 eV was assigned to –$NH_2$. The chemical bonding between GO and modified $SiO_2$ in $SiO_2$-GO was directly demonstrated by fitting the split peaks of N spectrum.

(5) Rubber Processing Analysis

A RPA-8000 rubber processing analyzer from Taiwan Gaotie Co., Ltd was used to analyze the vulcanization characteristics of the NR composite. 3-5 g of a NR composite was weighed, covered with cellophane on both sides, and placed on a rotor at 150° C. for the measurements of the optimum vulcanization time and the corresponding torque values.

Figure 5A:
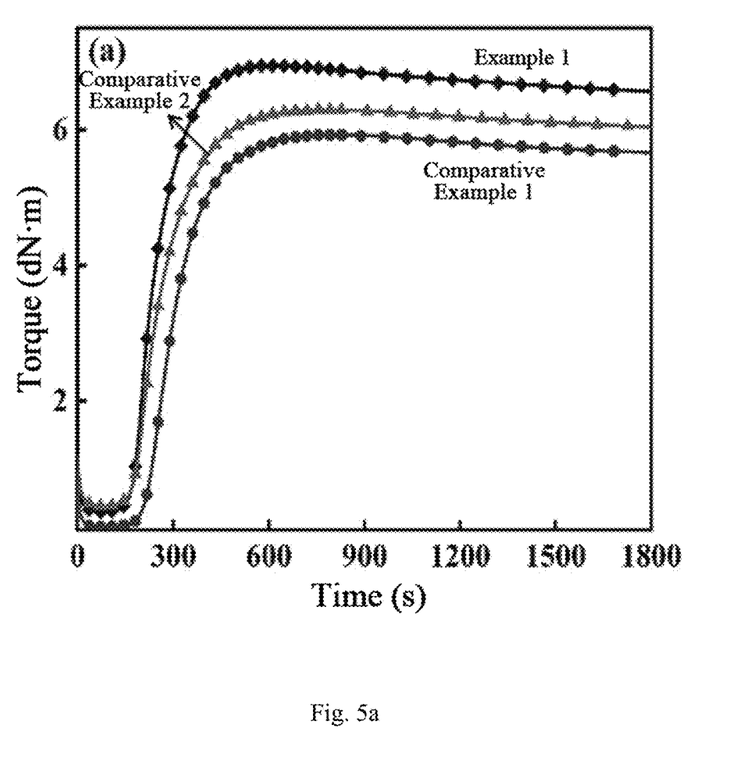
FIG. 5a shows the change of torque of graphene/natural rubber composites respectively prepared in Example 1, Comparative Example 1, and Comparative Example 2 of the present disclosure over time.
Figure 5B:
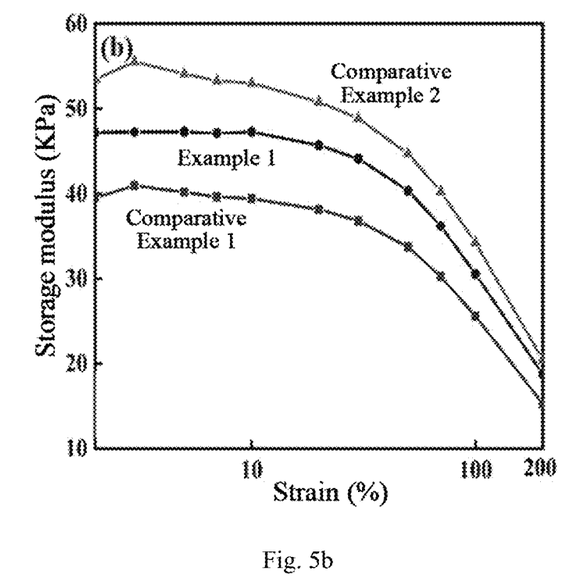
FIG. 5b shows the change of storage modulus of the graphene/natural rubber composites respectively prepared in Example 1, Comparative Example 1, and Comparative Example 2 of the present disclosure overstrain.

As shown in FIG. 5a, the NR composite prepared in Example 1 ($SiO_2$—$NH_3^+$/GO/NR) had the largest torque difference, indicating that it contained the most cross-linked network structures formed between graphene and the natural rubber matrix. This was mainly owing to the reversible electrostatic force, which renders an enhanced network structure of the whole composite, thus presenting the largest torque difference on a macroscopic level. FIG. 5b was a strain scan of the rubber composites, showing that the fillers were best dispersed in the rubber matrix when there existed electrostatic interaction between the GO layers, namely, in the $SiO_2$—$NH_3^+$/GO/NR composite prepared in Example 1.

(6) Cross-Link Density and Bonded Rubber Content Tests

The NR composite was weighed to 1 g (recorded as $m_0$) and immersed in an appropriate amount of toluene for 72 h for swelling, where the toluene was changed once per 24 h. After that, the swollen NR composite was taken out and placed on a filter paper. After the removal of toluene on the surface of the NR composite, it was weighed and recorded as $m_1$. Subsequently, the NR composite was dried in a blast oven at 50° C. to a constant weight, weighed, and recorded as $m_2$. The volume fraction of rubber in the swollen NR composite was calculated by the following formula:

$$Vr = \frac{m_0 \times \phi \times (1-\alpha)/\rho_r}{m_0 \times (1-\alpha)/+(m1-m_2)/\rho_s};$$

where $V_r$ represented a volume fraction of rubber in swollen NR composite; $\phi$ represented a mass fraction of rubber in NR composite; $\alpha$ represented the rate of mass loss of NR composite during swelling; $\rho_r$ represented a density of NR composite; and $\rho_s$ represented a density of toluene.

The cross-link density of the NR composite was calculated by a Flory-Rehner formula:

$$V_e = -\frac{\ln(1-V_r) + V_r + \chi V_r^2}{V_s(V_r^{1/3} - V_r/2)};$$

where $V_e$ represented the cross-link density of NR composite; $V_s$ represented the molar volume of toluene; and $\chi$ represented the solvent interaction parameter between rubber and toluene.

A differential scanning calorimeter was used to test and analyze the bonded rubber content of the NR composite. All tests were carried out at −80° C. to 25° C. with a heating rate of 5° C./min. The bonded rubber content of the NR composite was calculated by the following formula:

$$\Delta C_{pn} = \Delta C_p/(1-w); \text{ and}$$

$$\chi_{im} = (\Delta C_{p0} - \Delta C_{pn})/\Delta C_{p0};$$

where $\Delta C_p$ represented the jump in heat capacity of the rubber at a glass transition temperature; $\Delta C_{pn}$ represented the normalized value for the heat capacity difference of the NR composite filled with a filler; w represented the weight fraction of filler in the NR composite; $\Delta C_{p0}$ represented the jump in heat capacity at a glass transition temperature of the unfilled rubber matrix; and $\chi_{im}$ represented the bonded rubber content.

Figure 6A:
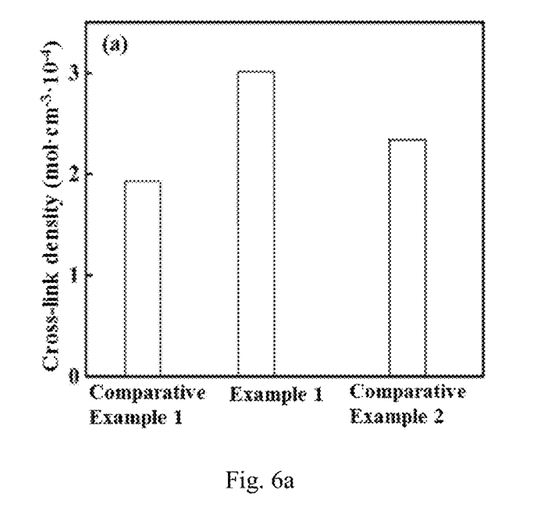
FIG. 6a shows the comparison among the graphene/natural rubber composite prepared in Example 1, Comparative Example 1, and Comparative Example 2 of the present disclosure in cross-link density.
Figure 6B:
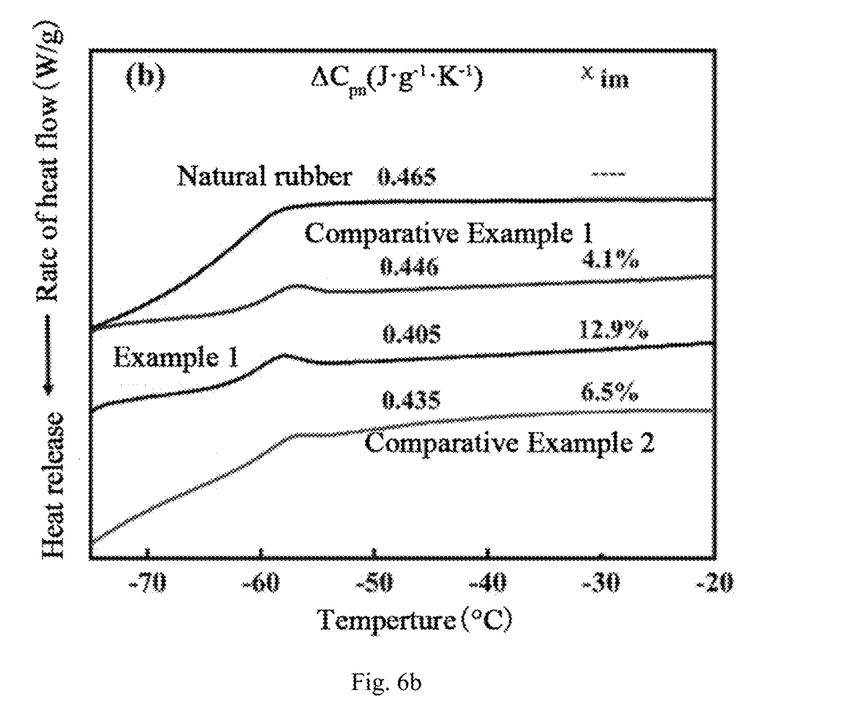
FIG. 6b shows the curve of normalized heat tolerance of the graphene/natural rubber composites respectively prepared in Example 1, Comparative Example 1, and Comparative Example 2 of the present disclosure versus temperature.

FIG. 6a showed that when the addition amount of GO was the same, the cross-link density of $SiO_2$—$NH_3^+$/GO/NR composite (namely, electrostatic interaction existed in the GO layers) prepared in Example 1 was much greater than that of $SiO_2$-GO/NR composite prepared in Comparative Example 1 (namely, hydrogen bonding existed in the GO layers) and $SiO_2$/GO/NR composite prepared in Comparative Example 2 (namely, chemical bonding existed in the GO layers). FIG. 6b showed that the proportion of rubber molecular chains fixed by GO in $SiO_2$—$NH_3^+$/GO/NR composite prepared in Example 1 was much greater compared with $SiO_2$-GO/NR composite prepared in Comparative Example 1 and $SiO_2$/GO/NR composite prepared in Comparative Example 2, intuitively demonstrating that the electrostatic force between the GO layers was reversible during dynamic movement, which enabled the filler to entangle a large number of rubber molecular chains and enhances the interfacial interaction between the filler and the rubber matrix.

The NR composites obtained from Examples 1-4 and Comparative Examples 1-3 were tested with respect to thermal conductivity, wear resistance and mechanical properties. The test for the thermal conductivity was carried out according to the Chinese National Standards GB/T3399, the test for the abrasion properties was carried out according to the Chinese National Standards GB/T9867-2008, and the test for mechanical properties was carried out according to standard of ISO37-2005 with a tensile rate of 500 mm/min and a tearing rate of 500 mm/min.

TABLE 2

Performance test results of graphene/natural rubber composites obtained from Examples 1-4 and Comparative Examples 1-3

| | Abrasion volume/ $mm^3$ | Tensile strength/ MPa | Elongation at break/% | Tearing strength/ (N/mm) | Thermal conductivity/ $(Wm^{-1}K^{-1})$ |
|---|---|---|---|---|---|
| Example 1 | 84.23 | 20.7 | 726.3 | 25.01 | 0.213 |
| Example 2 | 81.54 | 21.6 | 662.9 | 27.51 | 0.292 |
| Example 3 | 75.65 | 22.1 | 655.5 | 32.78 | 0.358 |
| Example 4 | 78.23 | 20.6 | 626.0 | 34.63 | 0.432 |
| Comparative Example 1 | 148.30 | 20.3 | 703.3 | 23.37 | 0.184 |
| Comparative Example 2 | 140.60 | 20.1 | 695.7 | 24.46 | 0.183 |
| Comparative Example 3 | 86.91 | 17.9 | 756.8 | 14.00 | 0.209 |

It was demonstrated by Table 2 that with the same graphene content, the $SiO_2$—$NH_3^+$/GO/NR composites prepared in Examples 1-4 were superior to those prepared in Comparative Examples 1-2 (respectively with hydrogen-bonded $SiO_2$-graphene and chemically-bonded $SiO_2$/graphene) in mechanical properties.

It should be noted that the above examples are only used to illustrate the technical solutions of the disclosure, and are not intended to limit the disclosure. Notwithstanding the present disclosure has been described in detail with reference to the aforementioned embodiments, it should be understood that modifications and equivalent replacements can be made by one of ordinary skill in the art to the technical solutions disclosed in the preceding embodiments. Any modifications or replacements made by those skilled in the art based on the content disclosed herein without departing from the spirit of the disclosure shall fall within the scope of the disclosure defined by the appended claims.

What is claimed is:

1. A method of preparing a graphene/natural rubber composite, comprising:
 (S1) evenly dispersing a silane coupling agent in a first solvent to obtain a hydrolysis solution, wherein the silane coupling agent is 3-aminopropyltriethoxysilane; evenly dispersing silica in a second solvent to obtain a first dispersion; and mixing the hydrolysis solution with the first dispersion, followed by reaction, vacuum filtration, rinsing, and drying, to obtain an amino-modified silica; and
 dispersing the amino-modified silica in deionized water by ultrasonication to produce a second dispersion; dropwise adding a citric acid solution to the second dispersion, followed by ultrasonication, centrifugation, and rinsing to pH 7 to obtain a protonated amino-modified silica dispersion; and adding the protonated amino-modified silica dispersion to a graphene oxide (GO) aqueous dispersion, followed by ultrasonication to obtain a silica-loaded GO aqueous dispersion, wherein the silica is loaded on GO surfaces through an electrostatic interaction;
 (S2) diluting a natural rubber (NR) latex with deionized water, followed by addition of the silica-loaded GO aqueous dispersion and uniform dispersion to obtain a mixed emulsion; adding a flocculant to the mixed emulsion to allow silica-loaded GO particles and rubber particles to absorb each other through π-π interaction, followed by aggregation and co-precipitation to obtain a crude rubber; and subjecting the crude rubber to washing, and drying to obtain a silica-loaded GO/NR masterbatch; and (S3) adding an anti-aging agent, an antioxidant, an activator, and a softening agent to the silica-loaded GO/NR masterbatch, followed by an internal mixing to obtain a rubber mixture; adding a vulcanization accelerator and a vulcanizing agent to the rubber mixture, followed by an open milling, mill run until the rubber mixture is free of air bubbles, and standing; and transferring the rubber mixture to a mold followed by vulcanization to obtain the graphene/natural rubber composite.

2. The method of claim 1, wherein in step (S1), the first solvent and the second solvent are independently a mixture of water and ethanol in a volume ratio of 1:1-3; the silane coupling agent is 5-15% by weight of the silica; the reaction is performed at 65-85° C. for 4-8 h; and the drying is performed at 50-70° C.

3. The method of claim 1, wherein in step (S1), a concentration of the amino-modified silica in the second dispersion is 50-300 mg/mL; and a concentration of the citric acid solution is 1.5-4 mol/L.

4. The method of claim 1, wherein in step (S1), a concentration of the GO aqueous dispersion is 0.5-10 mg/mL.

5. The method of claim 1, wherein in step (S1), a weight ratio of the amino-modified silica to the citric acid solution is 1-3:0.5-1; and in the silica-loaded GO aqueous dispersion, a weight ratio of GO to silica is 1:10-60.

6. The method of claim 1, wherein in step (S1), the ultrasonication is performed at 50-300 W.

7. The method of claim 1, wherein in step (S2), the NR latex is diluted with the deionized water to a concentration of 10-40 wt. %; a concentration of the flocculant is 10 wt. %; and a weight ratio of the flocculant to NR in the NR latex is 2-6:100.

8. The method of claim 1, wherein in step (S3), a weight ratio of the anti-aging agent to the antioxidant to the activator to the softening agent to the vulcanization accelerator to the vulcanizing agent is 1:1:5:2:2:2.

* * * * *